Aug. 26, 1958
L. W. SCHEU
2,848,815
FABRIC WIDTH GAGE
Filed March 27, 1956
2 Sheets-Sheet 1
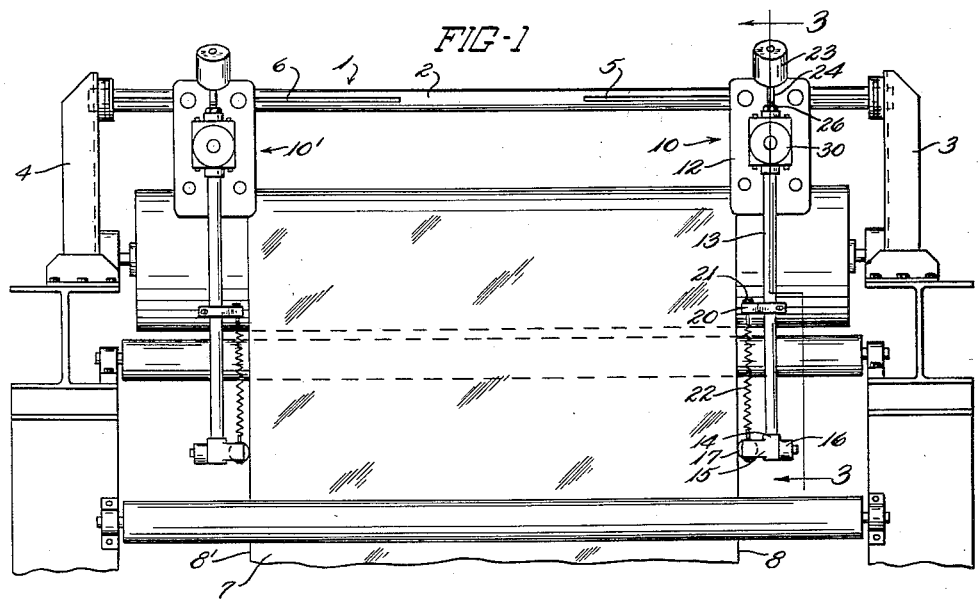
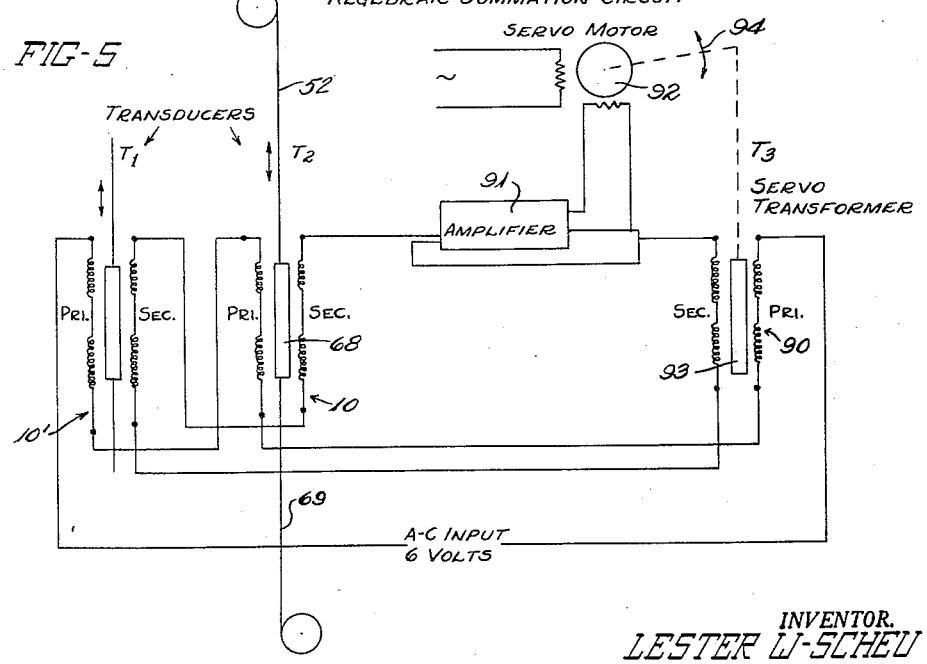
INVENTOR.
LESTER W. SCHEU
BY W. A. Fraser
ATTY-

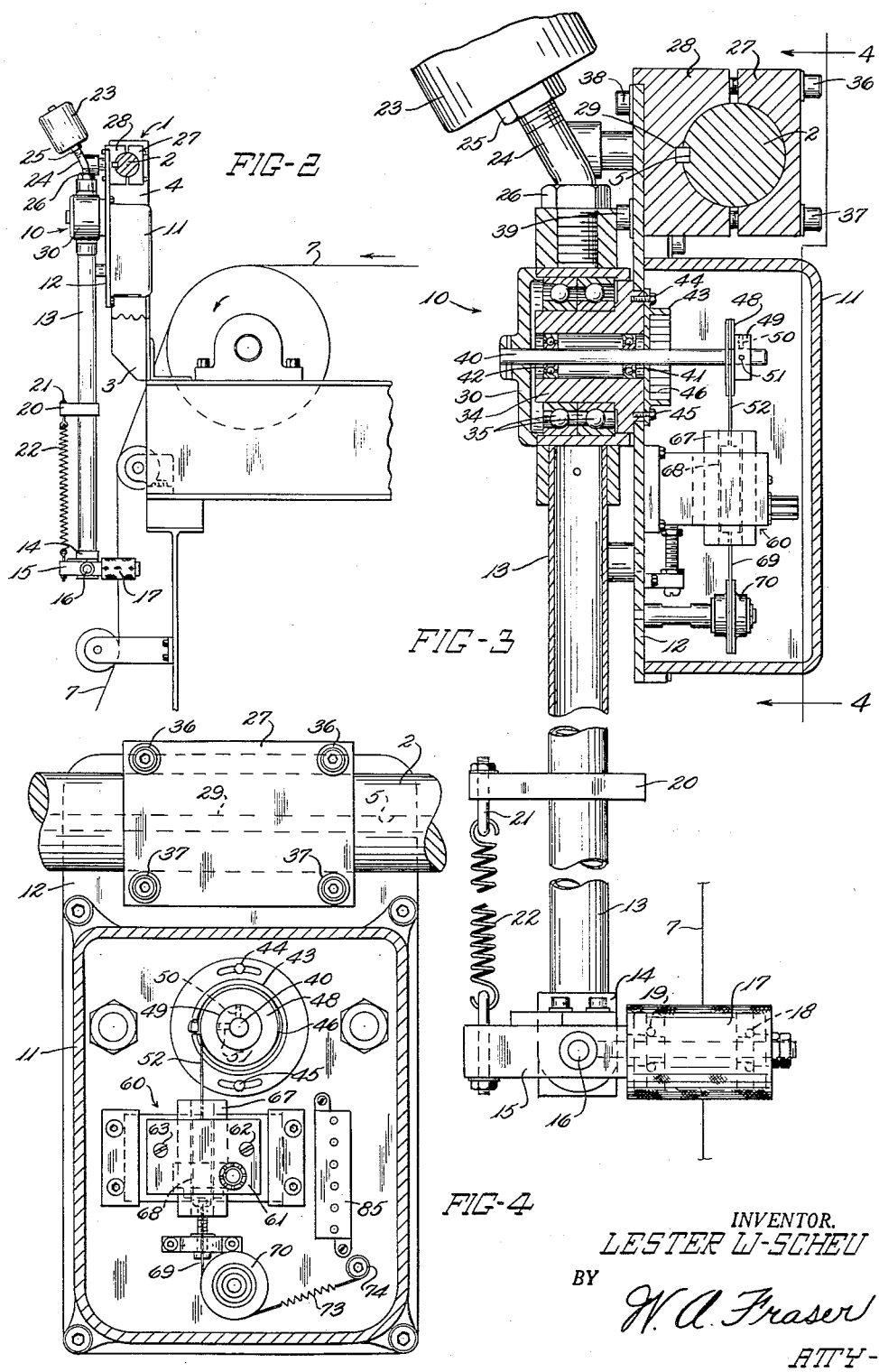

United States Patent Office 2,848,815
Patented Aug. 26, 1958

2,848,815

FABRIC WIDTH GAGE

Lester W. Scheu, Akron, Ohio, assignor to The Firestone Tire & Rubber Company, Akron, Ohio, a corporation of Ohio Application March 27, 1956, Serial No. 574,278

7 Claims. (Cl. 33—143)

This invention relates to means for measuring the width of continuous web material passing through a train of apparatus and more particularly to a width gage having fingers responsive to the lateral movement of the edges of continuous web material.

In the manufacture of paper, fabric, plastic or the like where a continuous web of material is passed through a train of treating apparatus having guide and drive rolls, it is important to know accurately at certain places in the train the exact width of the web. The train may not be stopped to make the desired measurement and conventional apparatus for measuring the width of the moving web has been unsatisfactory for various reasons.

The present invention provides a pair of arms respectively responsive to the edges of the passing web which vary the electrical characteristics of a transducer to actuate through suitable means a servomotor attached to a recording device.

It is therefore an object of the invention to provide means for automatically and continuously recording the width of a continuous passing web, to provide means respectively responsive to any lateral displacement of the edges of a passing web and adapted to record any changes therein, to provide a pair of mechanical arms respectively responsive to changes in the lateral position of the edges of a continuous web and adapted to vary the electrical output of a transducer in response thereto; to provide a pair of arms respectively responsive to lateral changes in the edges of a moving continuous web and electrically connected through a transducer and a servomotor to a recording pen; and to provide a recording pen for recording the width of passing continuous fabric responsive through a servomotor to the algebraic sum of the electrical outputs of two transducers controlled respectively by two arms responsive to respective edges of the web.

The preferred form of the invention will be described in relation to the manufacture of continuous webs of rubberized tire fabric and will be more fully understood by reference to the specification, claims and drawings of which:

Figure 1 is a view taken from the left of Figure 2.

Figure 2 is an end elevation of the gage of Figure 1.

Figure 3 is an enlarged broken sectional view taken along line 3—3 of Figure 1.

Figure 4 is a sectional view taken along line 4—4 of Figure 3.

Figure 5 is a wiring diagram of the circuit of the invention.

Referring to Figure 1, cross bar assembly generally indicated at 1 is comprised of a cross bar 2 supported at each end thereof by channel supports 3 and 4 and slotted to provide slide ways 5 and 6 to accommodate the adjustable edge sensing assembly generally indicated at 10 and 10'. In the form of the invention shown in Figure 1, the cross bar assembly is mounted so that fabric 7 has its edges 8 and 8' passing between the edge sensing assembly 10 and 10'.

Since the edge sensing assemblies 10 and 10' are identical in the opposite sense each from the other, only edge sensing assembly 10 will be described. This assembly is comprised of instrument box 11 mounted on back plate 12 attached to arm 13 at the end of which is mounted collar 14 supporting arm 15 (Fig. 2) through pivot 16. Roller 17 integrally mounts roller bearings 18 and 19 for rotatable support by arm 15 and is adapted to contact the edge 8 of fabric 7. An adjustable collar 20 is mounted on arm 13 in spaced relation to pivoted arm 15 (Fig. 2) and supports bolt 21 to which is attached balancing spring 22, the spring having the other end anchored in an eye bolt seated in one end of arm 15. Spring 22 serves to bias pivot arm 15 against the fabric edge 8.

A counter weight 23 is mounted on a weight supporting arm 24 in turn seated in the end of arm 13. Counter weight 23 is adjustable in respect to arm 24 through manipulation of jam nut 25. A second jam nut 26 permits adjustment of the arm 24 with respect to arm 13.

Edge sensing assembly 10 is mounted on cross bar 2 by the two halves 27 and 28 (Fig. 3) of a slide mounting which is anchored to plate 12 by bolts 38 and 39, the half mounting 27 being adjustable with respect to the half mounting 28 by means of mounting bolts 36 and 37. A key 29 is slidable in slide way 5 and serves to lock mounting 28 in position with respect to cross bar 2 and to prevent slippage of the edge sensing assembly 10 with respect to the cross bar. Plate 12 mounting the instrument box 11 is rigidly fixed to cross bar 2 but arm 13 is adapted to pivot about the instrument box 11 through axle 34 which is mounted in plate 12 and bearings 35—35 upon which is mounted pivot housing 30 to which is attached arm 13. A pivot pin 40 is attached to housing 30 at one end and journaled in bearings 41 and 42 extending into housing 11 where it is associated with apparatus to be described. A coil band spring 46 having one end anchored to pivot pin 40 is mounted in adjustable mounting plate 43 against the inner wall surface of plate 12 and adapted to bias pivot pin 40. By loosening bolts 44 and 45 (Fig. 3 and Fig. 4) the spring mounting plate can be adjusted to apply a greater or less tension on spring 46. The extending end of pivot pin 40 which extends cantilever fashion into instrument box 11 mounts pulley 48 held in position by lock collar 49 anchored by adjustable screws 50 and 51.

Referring to Figure 4, a transducer assembly generally indicated at 60 comprising mounting plate 61 is anchored to the inner wall surface of plate 12 by screws 62 and 63. The transducer assembly 60 is comprised of transducer 67 and adjustable core 68 having cables 52 and 69 anchored to respective ends thereof. Cable 52 is attached to pulley 48 while cable 69 is mounted around pulley 70 and attached to spring 73 anchored to screw 74. Transducer 67 is wired to terminal strip 85 and thence to an electrical circuit as shown in Figure 5.

As pivot pin 40 rotates in response to pivotal motion of arm 13, the pulley 48 moves cable 52 to adjust the core 68 in transducer 67 against the biasing of spring 73. The transducer output therefore is proportional to changes in the position of the edge of fabric 7.

Referring to Figure 5, the two transducers of the edge sensing assembly 10 and 10' are shown schematically with variable core 68 attached to cables 52 and 69. The primary coil of the transducer of edge sensing assembly 10 is wired to the primary coil of the transducer of the edge sensing assembly 10' in the A. C. circuit. The primary coil of a servo transformer is in series with the aforementioned primary coils of the transducers. The secondary coils of the transducers are in series with each other and with the secondary coil of the servo transformer. An amplifier 91 is connected to the secondary or induced current circuit and boosts the electrical output of the transducers to drive a servomotor 92. The armature of motor 92 drives the core 93 in the servo transformer to a position where the output of the servo transformer exactly balances the electrical output of the transducers. The servomotor stops when the balance point is reached since no current flows in the secondary circuit. An indicator pointer 94 of conventional design is mechanically coupled to the armature of the servomotor to indicate and record the magnitude of signal from the transducers. The indicator pointer is calibrated to read in width of fabric so that the exact change in fabric width can be read directly.

In operation of the device, variations in the width of fabric 7 change the position of the edges 8 and 8' which press against roller 17 or the respective roller on the other side of the sensing assembly. Arm 13 and housing 30 pivot on bearing 35 while pivot pin 40 anchored in housing 30 and journaled on bearings 41 and 42 is turned with respect to spring 46 to rotate pulley 48 pulling cables 52 and 69 against bias spring 73.

It will be seen that core 68 is pulled further into the transducer 67 (or in the opposite sense allowed to escape from the transducer 67) thereby varying the output of the transducer.

By referring to Figure 5, it may be seen that an A. C. electrical input of 6 volts is applied to the primary circuit. As core 68 (and the corresponding core of the transducer in edge sensing assembly 10') moves in and out of the transducer, the output of the transducer varies and the current induced in the secondary circuit is actually an error signal in that the algebraic sum of the output of the two transducers is measured. Amplifier 91 boosts the power of the secondary circuit to drive servomotor 92 to adjust the core 93 of servo transformer 90 sufficiently to balance out the error signal from the transducers.

As a servo motor adjusts itself to adjusted core 93 at servo transformer 90, the pointer 94 records on a moving chart, not shown, so that the variations in width of fabric 7 passing over the instrument are recorded.

An advantage of the invention lies in the fact that the servomotor 92 may be used to amplify and drive through a series of conventional circuits automatic width controllers which will bring the width of the passing fabric 7 close to the width desired.

While one form of the invention has been shown by way of example, it will be obvious to those skilled in the art that modification may be made within the scope of the following claims.

I claim:

1. A device for recording the lateral position changes of the edges of moving continuous sheet material comprising mechanical means responsive to lateral movement of each respective edge, two transducers having cores responsive to changes in position of each mechanical means, a servomotor, a servo transformer having a core movable in response to said servomotor, the primary coils of said transducers and said transformer connected in series to a source of alternating current, the secondary coils of said transducers and said transformer connected in series to said servomotor, and a recorder responsive to said servomotor whereby changes in position of said edges are reflected in changes in the electrical characteristics of said transducers and continuously reported to a position removed from said edges.

2. A device for recording the lateral position changes of the edges of moving continuous sheet material comprising two arms each responsive to lateral movement of one respective edge, two transducers each having a core responsive respectively to one of the arms, a servomotor, a servo transformer having a core responsive to said servomotor, the primary coils of said transducers and said transformer connected in series to a source of alternating current, the secondary coils of said transducers and said transformer connected in series to said servomotor, and a recorder responsive to said servomotor whereby changes in position of said edges are reflected in changes in the electrical characteristics of said transducers and continuously reported to a position removed from said edges.

3. A device for recording the lateral position changes of the edges of moving continuous sheet material comprising two arms each responsive to lateral movement of one respective edge, two transducers having cores each responsive respectively to one of the arms, a servomotor, a servo transformer having a core responsive to said servomotor, the primary coils of said transducers and said transformer connected in series to a source of alternating current, an amplifier, the secondary coils of said transducers and said transformer connected in series to said amplifier and said servomotor, and a recorder responsive to said servomotor whereby changes in position of said edges are reflected in changes in the electrical characteristics of said transducers and continuously reported at a position removed from said edges.

4. A device for monitoring the relative position of two edges of continuous sheet material passing over processing apparatus comprising means contacting each said edge and responsive to lateral changes in position thereof, an electrical circuit including two voltage inducing means in series each respectively responsive to one said edge contacting means, a third voltage inducing means in series in said circuit adapted to induce a voltage equal and opposite to the sum of the voltages induced by said first two inducing means when said material is of a desired width and means responsive to any flow of current in said circuit, said last responsive means adapted to vary the voltage induced in said third inducing means to a magnitude equal and opposite to said sum of the voltages of said first two inducing means.

5. A device for monitoring the relative position of two edges of continuous sheet material passing over processing apparatus comprising means contacting each said edge and responsive to lateral changes in position thereof, an electrical circuit including two voltage inducing means in series each respectively responsive to one said edge contacting means, a third voltage inducing means in series in said circuit adapted to induce a voltage equal and opposite to the sum of the voltages induced by said first two inducing means when said material is of a desired width and means responsive to any flow of current in said circuit, said last responsive means adapted to vary the voltage induced in said third inducing means to a magnitude equal and opposite to said sum of the voltages of said first two inducing means and to simultaneously express quantiatively said electrical current in terms of mechanical energy.

6. A device for monitoring the relative position of two edges of continuous sheet material passing over processing apparatus comprising means contacting each said edge and responsive to lateral changes in position thereof, an electrical circuit including two transducers in series each respectively responsive to one said edge contacting means, a third transducer in series in said circuit adapted to induce a voltage equal and opposite to the sum of the voltages induced by said first two transducers when said material is of a desired width and means responsive to any flow of current in said circuit, said last responsive means adapted to vary the voltage induced in said third transducer to a magnitude equal and opposite to said sum of the voltages of said first two transducers and to simultaneously express quantitatively said electrical current in terms of mechanical energy.

7. A method of measuring continuous web material as it passes through a train of treating apparatus comprising the steps of actuating two sensing means simultaneously with both passing edges of said material respectively, inducing a current in a circuit quantitatively in response to changes in position of both said edges, converting said current into mechanical energy, translating said mechanical energy proportionally into electrical energy and using said electrical energy to bring the current in said circuit back to zero.

References Cited in the file of this patent

UNITED STATES PATENTS

| | | |
|---|---|---|
| 2,299,997 | Ladrach | Oct. 27, 1942 |
| 2,514,847 | Coroniti et al. | July 11, 1950 |
| 2,522,877 | Ladrach | Sept. 19, 1950 |
| 2,730,006 | Gottschall | Jan. 10, 1956 |